United States Patent
Hardy

(10) Patent No.: US 10,664,202 B2
(45) Date of Patent: May 26, 2020

(54) NETWORK PRINTER DETECTION AND AUTHENTICATION FOR MANAGED DEVICE DEPLOYMENT

(71) Applicant: AirWatch LLC, Atlanta, GA (US)

(72) Inventor: Adam Michael Hardy, Alpharetta, GA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

(21) Appl. No.: 15/257,005

(22) Filed: Sep. 6, 2016

(65) Prior Publication Data

US 2018/0063373 A1    Mar. 1, 2018

Related U.S. Application Data

(63) Continuation of application No. 15/244,633, filed on Aug. 23, 2016.

(51) Int. Cl.
*G06F 3/12* (2006.01)
*H04W 8/00* (2009.01)
(Continued)

(52) U.S. Cl.
CPC .......... *G06F 3/1203* (2013.01); *G06F 3/1225* (2013.01); *G06F 3/1226* (2013.01);
(Continued)

(58) Field of Classification Search
CPC .. H04N 1/4406; H04N 1/4413; H04N 1/4433; H04N 2201/0082;
(Continued)

(56) References Cited

U.S. PATENT DOCUMENTS

2010/0014110 A1\* 1/2010 Munetomo .......... H04N 1/0084
                                                                358/1.14
2011/0138483 A1\* 6/2011 Bravo ...................... G06F 21/35
                                                                726/29
(Continued)

OTHER PUBLICATIONS

Breezy Enterprise Edition, "Secure Mobile Printing for AirWatch", www.breezy.com.
(Continued)

*Primary Examiner* — Tammy Paige Goddard
*Assistant Examiner* — Darryl V Dottin
(74) *Attorney, Agent, or Firm* — Thomas | Horstemeyer, LLP

(57) ABSTRACT

Disclosed are various examples for network printer detection and authentication for managed device deployment. In one example, a computing environment can receive an identifier from a client device over a network, where the client device detects the identifier based on a wireless transmission performed by a transmitter in association with a print operation assigned to a network printer. The computing environment can determine whether an authentication is required at the network printer in association with the print operation and cause an agent application executable on the client device to obtain authentication data. An authentication can be performed based on the authentication data received from the client device and, in response to a successful authentication, causes the print operation to be performed by the network printer.

20 Claims, 8 Drawing Sheets

(51) Int. Cl.

| | |
|---|---|
| *H04W 4/06* | (2009.01) |
| *H04W 4/08* | (2009.01) |
| *H04W 12/08* | (2009.01) |
| *H04W 76/14* | (2018.01) |
| *H04W 4/80* | (2018.01) |
| *H04L 29/08* | (2006.01) |
| *H04N 1/00* | (2006.01) |
| *H04L 29/06* | (2006.01) |
| *H04N 1/32* | (2006.01) |
| *H04N 1/44* | (2006.01) |
| *H04W 12/06* | (2009.01) |
| *H04W 8/24* | (2009.01) |

(52) U.S. Cl.
CPC .......... *G06F 3/1236* (2013.01); *G06F 3/1285* (2013.01); *H04L 63/104* (2013.01); *H04L 67/16* (2013.01); *H04N 1/00238* (2013.01); *H04N 1/00307* (2013.01); *H04N 1/32512* (2013.01); *H04N 1/442* (2013.01); *H04N 1/4413* (2013.01); *H04W 4/06* (2013.01); *H04W 4/08* (2013.01); *H04W 4/80* (2018.02); *H04W 8/005* (2013.01); *H04W 12/06* (2013.01); *H04W 12/08* (2013.01); *H04W 76/14* (2018.02); *H04N 2201/006* (2013.01); *H04N 2201/0039* (2013.01); *H04N 2201/0055* (2013.01); *H04N 2201/0082* (2013.01); *H04N 2201/0091* (2013.01); *H04W 8/24* (2013.01)

(58) Field of Classification Search
CPC ..... H04N 2201/0091; H04N 2201/006; H04N 2201/0055; H04N 2201/0039; H04N 1/00307; H04N 1/00238; H04N 1/442; H04N 1/32512; G06F 3/1203; G06F 3/1285; G06F 3/1226; G06F 3/1236; G06F 3/1225; H04L 63/104; H04L 67/16; H04W 12/08; H04W 4/08; H04W 4/06; H04W 8/005; H04W 8/24; H04W 12/06; H04W 76/14; H04W 4/80
USPC ...................................................... 358/1.15
See application file for complete search history.

(56) References Cited

U.S. PATENT DOCUMENTS

| | | | |
|---|---|---|---|
| 2012/0314250 A1 | 12/2012 | Ito | |
| 2014/0056313 A1 | 2/2014 | Wada | |
| 2015/0261482 A1 | 9/2015 | Takano | |
| 2016/0077778 A1* | 3/2016 | Aritomi | ................. G06F 21/35 358/1.15 |
| 2016/0094560 A1* | 3/2016 | Stuntebeck | ........... H04L 63/102 726/1 |
| 2017/0134606 A1* | 5/2017 | Kim | ................. H04N 1/32117 |

OTHER PUBLICATIONS

Breezy Architecture Overview, "Secure Mobile Printing from Any Device to Any Printer", www.breezy.com.
Office Action dated Nov. 24, 2017 for U.S. Appl. No. 15/244,633.
Office Action dated May 17, 2018 for U.S. Appl. No. 15/244,633.
Office Action dated for U.S. Appl. No. 15/244,633.

\* cited by examiner

NETWORK PRINTER DETECTION AND AUTHENTICATION FOR MANAGED DEVICE DEPLOYMENT

CROSS-REFERENCE TO RELATED APPLICATION

This application is a continuation of and claims the benefit of co-pending U.S. patent application Ser. No. 15/244,633, filed on Aug. 23, 2016, entitled "NETWORK PRINTER DETECTION AND AUTHENTICATION FOR MANAGED DEVICE DEPLOYMENT," the contents of which are incorporated by reference in their entirety herein.

BACKGROUND

With the emergence of bring-your-own-device (BYOD) technology in the workplace, an enterprise can permit its employees to use their own devices to access enterprise data, such as email and corporate documents. However, prior to an employee using his or her own device in the workplace, the enterprise can require the employee to enroll with a management service capable of protecting enterprise data stored on a device from theft, data loss, and unauthorized access.

Particular operating systems offer device management capabilities that allow an administrator, such as one associated with an enterprise, to remotely manage the configuration of a device. For example, an administrator of an enterprise can remotely install applications, resources, or other data on an employee's device. However, configuring printer settings on managed devices can be difficult. Printers are often added or replaced, internet protocol (IP) addresses can change, and so forth. In BYOD environments, it is less important to bind devices to a directory service domain. As a result, devices in a BYOD environment are not able to access printers without assistance.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
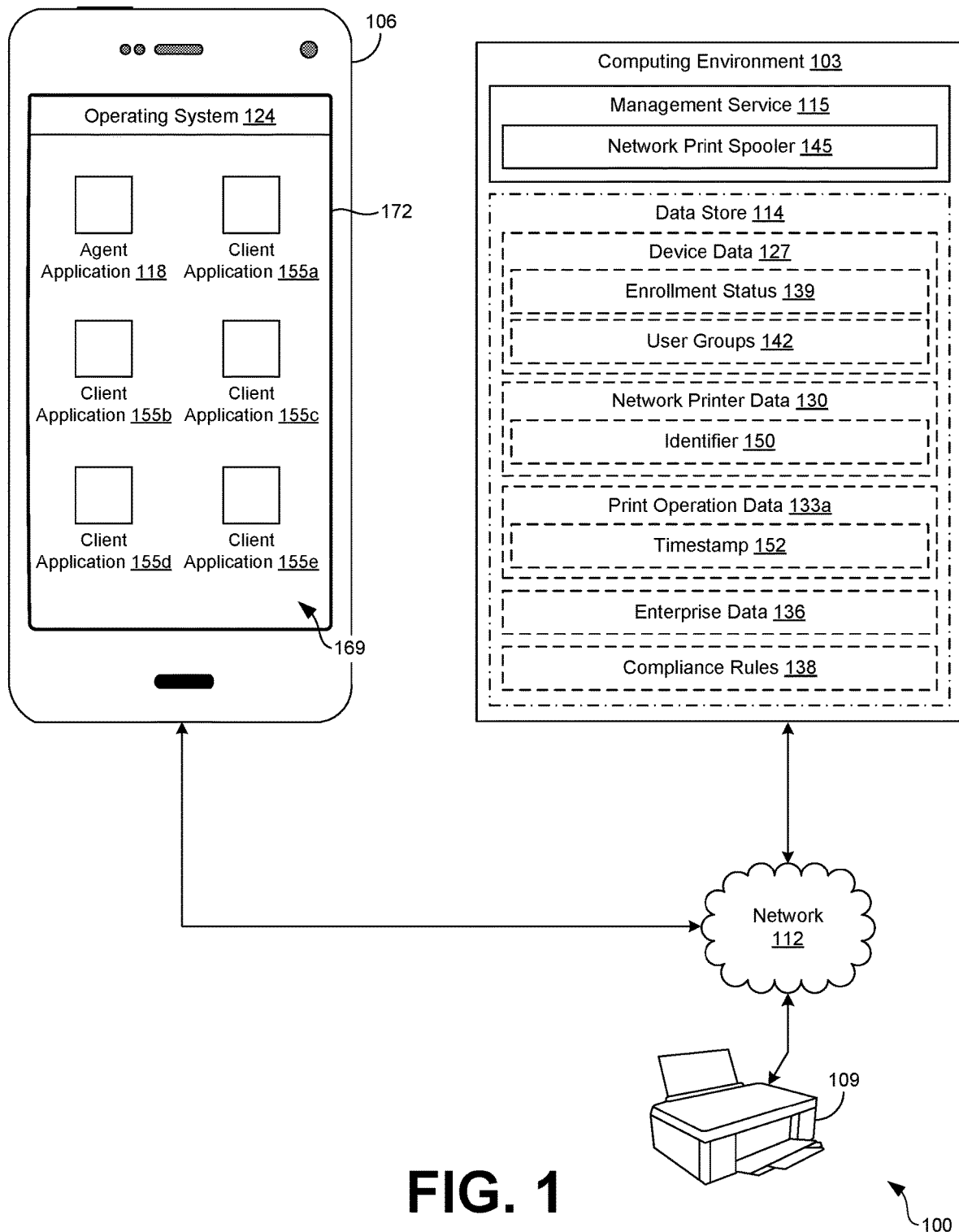
FIG. 1 is a drawing of a networked environment including a management service, a network print spooler, a network printer, and a client device.

The present disclosure relates to network printer detection and authentication for managed device deployment. A management service can provide an administrator, such as one associated with an enterprise, with the ability to remotely manage the configuration of devices enrolled with the management service. For example, an administrator of an enterprise can use a web-based user interface (i.e., "console") to direct the management service to remotely install applications and resources on an employee's device, or configure the employee's device to adhere to various enterprise security policies. However, configuring printer settings on managed devices can be difficult. For example, an enterprise office may often add, remove, or replace printers. Additionally, the internet protocol (IP) addresses for the printers can change.

Current solutions provide leveraging a directory service, such as Active Directory®, offered by Microsoft®, to allow network devices to access available printers. However, a user is still required to locate a nearby printer and configure their device to access the printer. Additionally, this can require enterprise devices to be bound to an enterprise domain. Other solutions still include manually configuring a device to have access to a printer. This can include installing a driver, manually specifying an internet protocol (IP) address for a printer, providing a name for the printer, and so forth.

As BYOD environments become increasingly utilized by various enterprises, binding computers to a domain for a directory service is becoming less common. Without a directory service, users are unable to detect available printers or locate physical locations of the printers without enlisting assistance from helpdesk staff or information technology (IT) professionals. However, embodiments described herein include a management service having mechanisms capable of remotely configuring managed devices to have access to, and locate, available network printers.

According to one example provided herein, a remote computing environment can automatically detect when printers are added or removed from a network and allow an administrator of a management service to specify which enrolled devices have access to particular network printers. Further, the remote computing environment can manage print operations remotely, as opposed to an enterprise device located in an internal network. The remote computing environment can also provide additional security, for example, by requiring an enrolled device to provide authentication information prior to releasing a print operation for a network printer.

According to some examples described herein, the remote computing environment can maintain a listing of network printers for an organization, such as an enterprise. The listing of the network printers can be obtained and periodically updated from a printer discovery service executed in an enterprise device, for example, located in an intranet behind a firewall. An enterprise device can include an on-premise server in an enterprise network having an instance of the printer discovery service installed thereon, where the printer discovery service is capable of sending outbound communications to the remote computing environment without impediment by the firewall.

The remote computing environment can serve up the listing of network printers to an administrator through a console, allowing the administrator to specify which enrolled devices have access to particular network printers. In one example, the administrator can associate access to network printers with a user group, where any client devices associated with the user group can access specified network printers. The remote computing environment can configure the enrolled devices to access the specified network printers.

With reference to FIG. 1, shown is an example of a networked environment 100. The networked environment 100 can include a computing environment 103, a client device 106, and a network printer 109 in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 112, the computing environment 103 can be described as a remote computing environment 103 or a collection of one or more remote computing devices.

The data store 114 can include memory of the computing environment 103, mass storage resources of the computing environment 103, or any other storage resources on which data can be stored by the computing environment 103. The data stored in the data store 114, for example, can be associated with the operation of the various applications and/or functional entities described below.

The components executed on the computing environment 103 can include, for example, a management service 115 as well as other applications, services, processes, systems, engines, or functionality not discussed in detail herein. The management service 115 can be executed to oversee the operation of client devices 106 enrolled with the management service 115 as well as manage print operations performed by the client devices 106. In some embodiments, an enterprise, such as one or more companies or other organizations, can operate the management service 115 to oversee or manage the operation of the client devices 106 of its employees, contractors, customers, students, or other users having user accounts with the enterprise.

The management service 115 can remotely configure the client device 106 by interacting with an agent application 118 executed on the client device 106. For instance, the management service 115 can communicate various software components to the client device 106 which are then installed or configured by the agent application 118. Such software components can include, for example, client applications 155a ... 155e (collectively "client application 155"), resources, libraries, drivers, device configurations, or other similar components that require installation on the client device 106 as specified by an administrator of the management service 115. The management service 115 can further cause policies to be implemented on a client device 106. Policies can include, for example, restrictions or permissions pertaining to capabilities of a client device 106. For instance, policies can require certain hardware or software functions of the client device 106 to be enabled or be disabled during a certain time period or when the client device 106 is physically located at a particular location.

The management service 115 can interact with one or more client applications 155 executed on the client device 106 by transmitting data over the network 112. In one embodiment, the management service 115 can interact with an agent application 118 on the client device 106 to enroll the client device 106 with the management service 115. During the enrollment, the agent application 118 can be registered as a device administrator of the client device 106, which can provide the agent application 118 with sufficient privileges to control the operation of the client device 106. In one example, the agent application 118 can be registered as the device administrator through the installation of a management profile in a profile bank of the operating system 124 of the client device 106 in response to a user of the client device 106 accepting various terms and conditions related to management of the client device 106. The installation of the management profile in the profile bank of the operating system 124 causes the operating system 124 to designate the agent application 118 as the device administrator, which allows the agent application 118 or the management service 115 to instruct the operating system 124 to perform certain operations and configure the client device 106.

The management service 115 can instruct the agent application 118 to perform device management functions on the client device 106. For example, the management service 115 can direct the agent application 118 to control access to certain software or hardware functions available on the client device 106. As a result, the management service 115 can verify that configuration and operation of the client device 106 is in conformance with predefined criteria that ensures that enterprise data, or other data, is protected from data loss, unauthorized access, or other harmful event. The management service 115 can further provision enterprise data to the client device 106 through the agent application 118.

In one example, the management service 115 can cause the agent application 118 to control use of the client device 106 or provision enterprise data to the client device 106 through use of a command queue provided by the management service 115. The management service 115 can store commands in a command queue associated with a particular client device 106 and can configure the agent application 118 executed by the client device 106 to retrieve the contents of the command queue. In one example, the agent application 118 can be configured to retrieve the contents of the command queue on a configured interval, such as every four hours, or upon occurrence of a certain event, such as a detection of an unauthorized application executed by the client device 106. In any case, the agent application 118 can retrieve the contents of the command queue by checking in with the management service 115 and requesting the contents of the command queue. In one example, the contents of the command queue can include a command that the agent application 118 causes to be executed on the client device 106. In another example, the contents of the command queue can include a resource or a client application 155 that the agent application 118 causes to be installed on the client device 106, which the client device 106 may access through a specified uniform resource locator (URL).

The data stored in the data store 114 can include, for example, device data 127, network printer data 130, print operation data 133, enterprise data 136, compliance rules 138, as well as other data. Generally, device data 127 includes data associated with a configuration of a client device 106 enrolled or managed by the management service 115. For instance, the device data 127 can include an enrollment status 139 indicating whether a client device 106 has been enrolled with the management service 115. In one example, a client device 106 designated as "enrolled" can be permitted to access the enterprise data 136 while a client device 106 designated as "not enrolled," or having no designation, can be denied access to the enterprise data 136.

Additionally, device data 127 can include a plurality of indications of the state of the client device 106. In one example, such indications can specify applications 155a-155e that are installed on the client device 106, configurations or settings that are applied to the client device 106, user accounts associated with the client device 106, the physical location of the client device 106, the network to which the client device 106 is connected, and other information describing the current state of the client device 106. In another example, Further, device data 127 can also include data pertaining to user groups 142. An administrator can specify one or more of the client devices 106 as belonging to a particular user group 142. User groups 142 can be created by an administrator of the management service 115 such that a batch of client devices 106 can be configured according to common settings. For instance, an enterprise can create a user group 142 for the marketing department and the sales department, where the client devices 106 in the marketing department are configured differently from the client devices 106 in the sales department.

Network printer data 130 can include information pertaining to one or more network printers 109 identified in an enterprise network. In one example, an enterprise network includes a local area network (LAN) behind, or managed by, a firewall where enterprise devices can be bound to a single domain. In other words, the enterprise devices have an IP address in a range of authorized enterprise IP addresses. A firewall can include one or more software or hardware components of an enterprise network that act as a barrier between a trusted network, such as the enterprise network, and other untrusted networks, such as the Internet. In some examples, the firewall controls access to the resources of an enterprise network through a positive control model where only traffic allowed onto the enterprise network defined in a firewall policy is permitted while all other traffic is denied or rerouted.

Network printer data 130 can include various information pertaining to a network printer 109, such as a name, an IP address, a physical location, configuration settings, driver settings, as well as other information. The network printer data 130 can also include identifiers 150 that uniquely identify one of the network printers 109 or a print operation. In some examples, the identifiers 150 can be generated by the computing environment 103 and communicated to a network printer 109 (or directly to a transmitter associated with the network printer 109) for wireless transmission, as will be discussed.

Print operation data 133 can include information pertaining to active or inactive print operations, also referred to as print jobs. For instance, when a client device 106 initiates a print operation, such as printing an enterprise document or other portion of enterprise data 136, the print request can be communicated from the client device 106 to the computing environment 103. A network print spooler 145 executed in the computing environment 103 can manage and oversee print operations, assign print operations to appropriate network printers 109, and other functions as will be described. The print operation data 133 can include, for example, a requesting client device 106 that specifies the client device 106 that initiated a print operation, a timestamp 152, as well as data used to print the requested document.

Compliance rules 138 can include, for example, configurable criteria that must be satisfied for an enrolled one of the client devices 106 to be "in compliance" with the management service 115. In one example, compliance rules 138 can include predefined constraints that must be met in order for the management service 115, or other applications, to permit access to the enterprise data 136. In some examples, the management service 115 communicates with the agent application 118 or other client application 155 executable on the client device 106 to determine whether vulnerabilities exist on the client device 106 that do not satisfy one or more compliance rules 138. Some of these vulnerabilities can include, for example, a virus or malware being detected on the client device 106; installation or execution of a blacklisted client application 155; a client device 106 being "rooted" or "jailbroken," where root access is provided to a user of the client device 106. Additional vulnerabilities can include the presence of particular files, questionable device configurations, vulnerable versions of client applications 155, or other vulnerability, as can be appreciated. Compliance rules 138 can be specified by an administrator at the document-level, application-level, device-level, and can allow or restrict printing to specific network printers 109.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a smartwatch, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability. In some embodiments, the client device 106 is mobile where the client device 106 is easily portable from one location to another.

The client device 106 can include an operating system 124 configured to execute various client applications 155, such as the agent application 118 or other application. Some client applications 155 can access network content served up by the computing environment 103 or other servers, thereby rendering a user interface 169 on a display 172, such as a liquid crystal display (LCD), touch-screen display, or other type of display device. To this end, some client applications 155 can include a browser or a dedicated application, and a user interface can include a network page, an application screen, or other interface. Further, other client applications 155 can include device management applications, enterprise applications, social networking applications, word processors, spreadsheet applications, media player applications, or other applications.

The network printer 109 can be representative of one or more network printers 109. The network printer 109 can include processing circuitry, such as a processor-based system, that causes human-readable graphics or text to be imposed on paper or similar physical media. In some examples, the network printer 109 can include networking hardware and software to receive print operations communicated to the network printer 109 over the network 112. Additionally, in some examples, the network printer 109 can include color inkjet printers, black-and-white laser printers, dot-matrix printers, three-dimensional (3D) printers, as well as other types of network printers 109. The network printer 109 can include a printer operating system and printer application executable in the processing circuitry to oversee and manage printing of documents. In various examples, the network printer 109 can be include or be associated with a transmitter, such as a wireless transmitter. The transmitter can broadcast an identifier 150 to provide additional security measures for print operations, as will be discussed.

Figure 2:
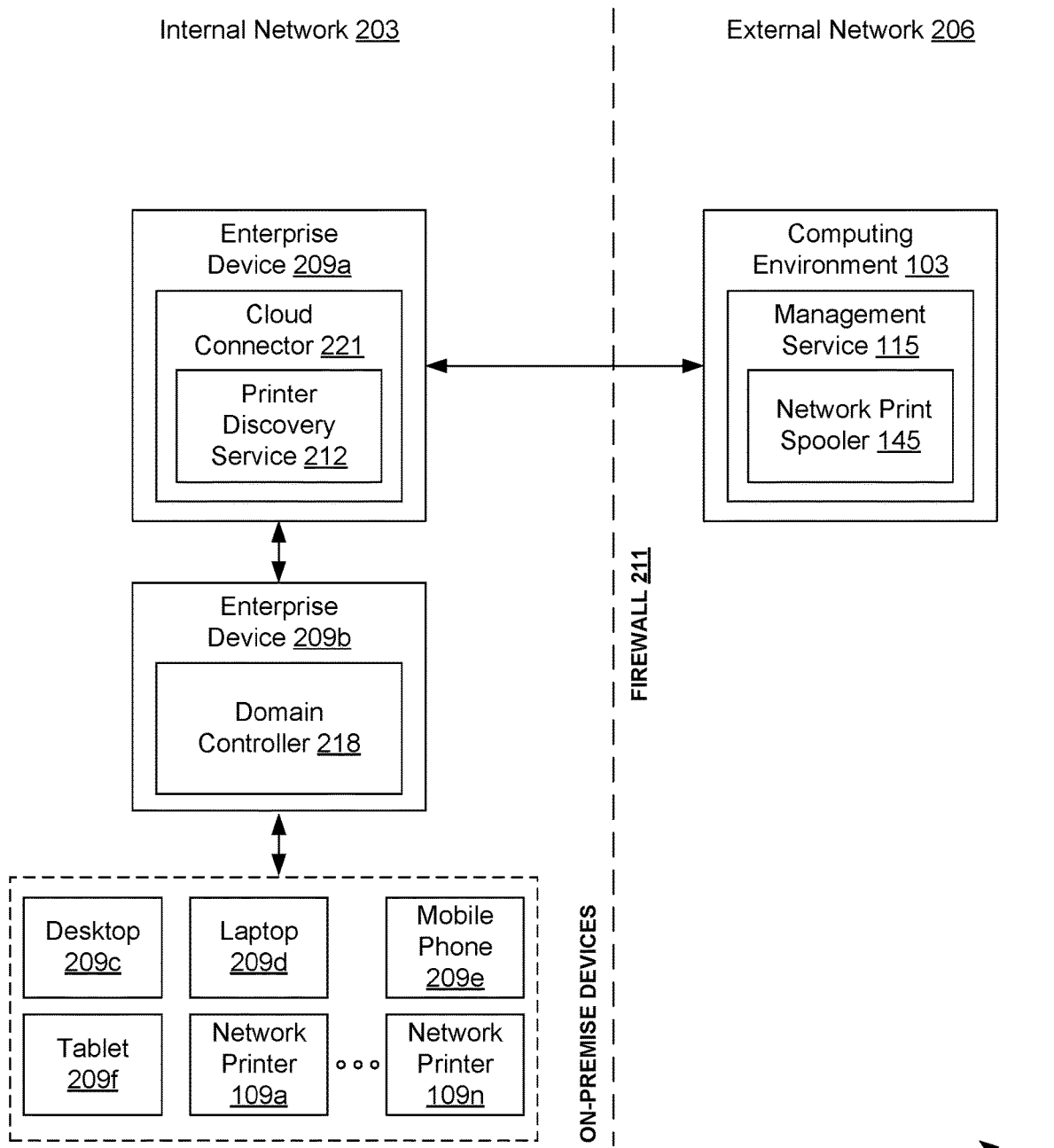
FIG. 2 is a drawing of a schematic diagram showing components of the networked environment.

With reference to FIG. 2, shown is a schematic diagram illustrating functionality of the components of the networked environment 100. The networked environment 100 can be described as including an internal network 203 and an external network 206. The internal network 203 can include, for example, an enterprise network made up of enterprise devices 209a . . . 209f managed by a firewall 211. To this end, the internal network 203 can include a LAN, and the enterprise devices 209 can include servers, desktop computers, laptop computers, mobile phones or smartphones, tablet computers. In some examples, the enterprise devices 209 can include network printers 109a . . . 109n. The components of the internal network 203 can be referred to as "on premise" components as they are physically installed or executing on enterprise devices 209 on the premises (in the building) of an enterprise, rather than at a remote facility such as a server farm or a cloud-based computing environment 103. Additionally, the enterprise devices 209 can include devices being bound to an IP address in a range of IP addresses associated with the enterprise. To this end, the enterprise devices 209 can be restricted from unfettered communication with the external network 206. In some examples, the enterprise devices 209 can only send or receive communications from the external network 206 as authorized by the firewall 211.

The firewall 211 can include one or more software or hardware components of the internal network 203 that act as a barrier between the internal network 203, and other untrusted networks, such as the external network 206. In some examples, the external network 206 is the Internet. The firewall 211, for example, can control access to the resources of an enterprise network where only traffic allowed onto the enterprise network defined in a firewall policy is permitted while all other traffic is denied or rerouted.

According to examples provided herein, one or more of the enterprise devices 209 can include a server executing an instance of a printer discovery service 212. The printer discovery service 212 can include an application or service that generates and maintains a listing of network printers 109 in the internal network 203. For instance, as the printer discovery service 212 is executed in an enterprise device 209 in the internal network 203, the printer discovery service 212 is able to communicate with a domain controller 218 to identify additions, modifications, or removals of network printers 109 in the internal network 203. When a network printer 109 is detected, the printer discovery service 212 can identify an IP address for the network printer 109, query the network printer 109 at the IP address to obtain configuration data associated with that network printer 109, and perform similar functions. Configuration data can include drivers or other settings required to provide access to a network printer 109 on a client device 106.

The printer discovery service 212 can be configured to communicate the listing of the network printers 109 to the management service 115, thereby allowing an administrator of the management service 115 to designate which users or user groups 142 have access to particular network printers 109. In some examples, the printer discovery service 212 is a subcomponent of a cloud connector 221, such as the AirWatch® Cloud Connector (ACC), operated by VMWare® AirWatch®. The cloud connector 221 can include a server application that provides enterprises the ability to integrate existing enterprise infrastructure with a management service 115 operated in the computing environment 103, for instance, by a third party.

In one example, the cloud connector 221 can be executed in an enterprise device 209 in the internal network 203 to act as a proxy server that securely transmits requests from the management service 115 to the infrastructure components of the enterprise, such as enterprise devices 209 located in the internal network 203. In another example, a hypertext transfer protocol over transport layer security (HTTPS) connection can be created from the cloud connector 221 to the management service 115, where the cloud connector 221 can transmit information from enterprise devices 209 to the management service 115 without requiring changes to policies implemented by the firewall 211. These configurations allow enterprises to use a management service 115 operated by a third party, running in any configuration, with existing lightweight directory access protocols (LDAP), certificate authorities, email systems, and other enterprise systems.

Figure 3:
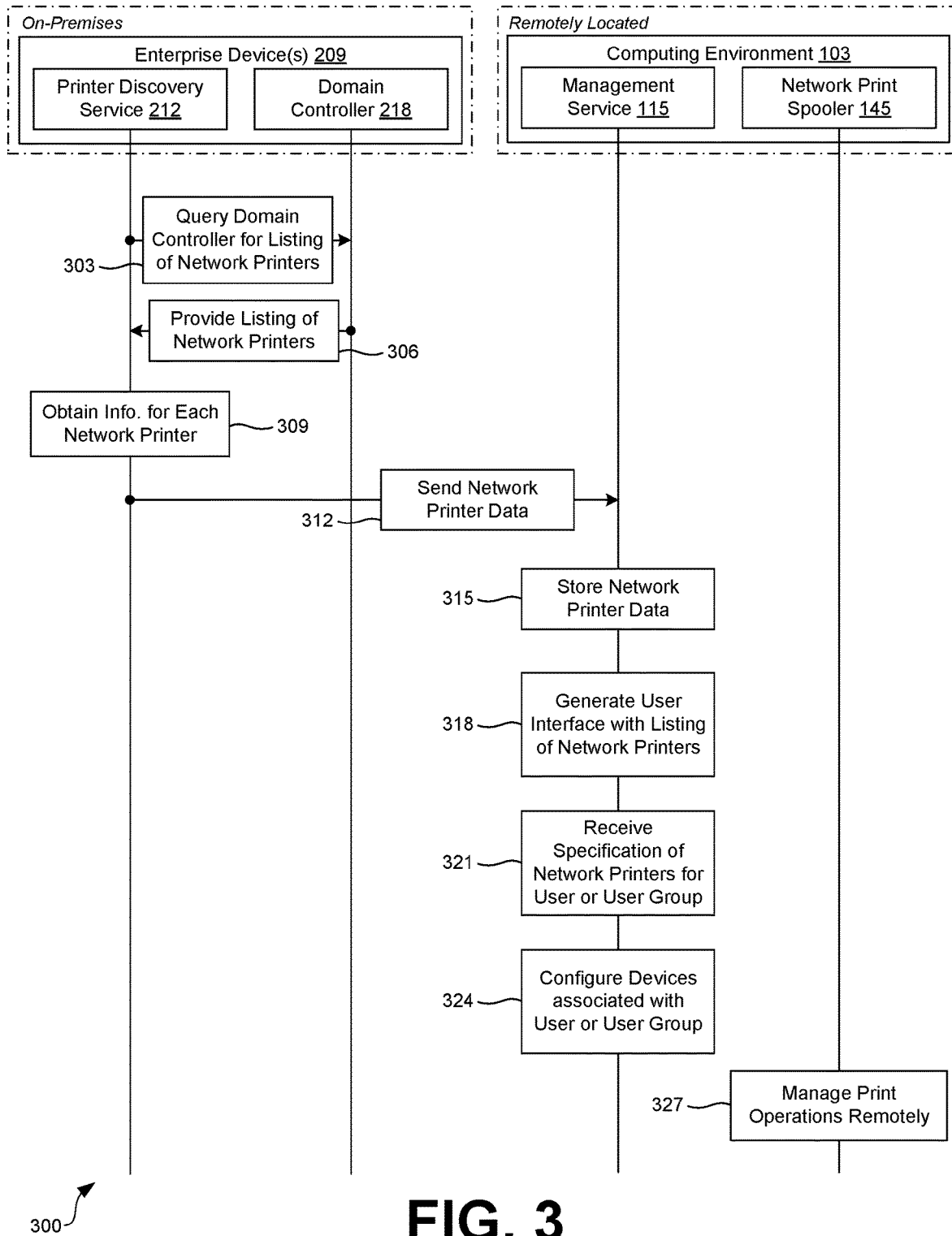
FIG. 3 is a sequence diagram illustrating functionality implemented by components of the networked environment.

Turning now to FIG. 3, shown is a sequence diagram 300 illustrating various functionality of the components of the networked environment 100 to provide network printer detection and authentication for managed device deployment. Starting with step 303, the printer discovery service 212 can query a domain controller 218 in an internal network 203 to obtain or update a listing of network printers 109. Next, in step 306, the domain controller 218 can provide the listing of the network printers 109 to the printer discovery service 212. In one example, the listing of the network printers 109 merely includes names or IP addresses for potential network printers 109.

Next, in step 309, the printer discovery service 212 can query each of the network printers 109 in the listing to obtain additional information about the network printers 109 that may be required in order to properly configure client devices 106 to access the network printers 109 or to successfully authenticate to the network printers 109. For instance, the printer discovery service 212 can query the network printers 109 to obtain drivers or other required configurations to configure the client devices 106 to access the network printers 109, notwithstanding individual ones of the client devices 106 having different operating systems 124 or versions of operating systems 124 executed thereby. Additionally, the printer discovery service 212 can identify one or more credentials required for the network printers 109 to accept or perform a print job; in one example, the credentials include one or more of a token, certificate, or other data used to validate authenticity. The printer discovery service 212 can also query the network printers 109 periodically to maintain an operational status of the network printers 109 and identify any changes to the settings or configuration of the network printers 109.

In step 312, the printer discovery service 212 can generate network printer data 130 from the information obtained at steps 306 and 309 and can send the network printer data 130 to the management service 115. Despite the presence of a firewall 211, the printer discovery service 212 can send the network printer data 130, for example, through the cloud connector 221, a proxy server, or other suitable device. In step 315, the management service 115 stores the network printer data 130 in the data store 114 or other appropriate memory device.

Next, in step 318, the management service 115 can generate a series of one or more user interfaces 169 that include the listing of the network printers 109. For instance, the management service 115 can provide an administrator console that allows administrators to specify the configuration of client devices 106 enrolled with the management service 115. In one example, the listing of the network printers 109 are provided in the administrator console to allow the administrator to specify which users or user groups 142 have access to particular ones of the network printers 109. Additionally, printer access can be assigned to users, user groups 142, or devices based on geographical location (e.g., geo-fences defined by a plurality of pairings of longitude and latitude coordinates), organizational group, transmitter locations, employment status or role or department, or other criteria.

As can be appreciated, access can be provided to network printers 109 for any user that enrolls his or her client device 106 with the management service 115. As printers are added to or removed from an enterprise network, the printer discovery service 212 can detect such changes and automatically update settings on client devices 106. As a result, network printers 109 available on a client device 106 will remain current and the user can properly use network printers 109 without requiring the client device 106 to be bound to an enterprise domain.

Additionally, through the administrator console, an administrator can specify compliance rules 138 that must be satisfied for print operations to be performed. In one example, the administrator can specify that client devices 106 associated with a certain user group 142 are only allowed to perform print operations between a certain time, such as between 9:00 AM and 5:00 PM on a work day. In other examples, the administrator can specify that the client devices 106 associated with a certain user group 142 are only allowed to perform print operations when a client device 106 is located in a particular office or within a predefined distance of a network printer 109. As can be appreciated, such constraints can ensure the efficient use of printer resources by preventing the printing of personal documents, accidental print operations being performed in a different office building, as well as potential loss of sensitive enterprise data 136.

In step 321, the management service 115 can receive a specification of one or more of the network printers 109 in association with one or more users or user groups 142. For instance, a marketing group of an enterprise can be assigned one or more network printers 109 located on their respective floor of an office building, while a sales group of an enterprise can be assigned other network printers 109.

Next, in step 324, the management service 115 configures the client devices 106 enrolled with the management service 115 to have access to the network printers 109 specified by the administrator. In one example, the management service 115 provides network printer data 130 to the agent application 118 executable on the client device 106. The agent application 118 can install drivers for the network printers 109, add the network printers 109 without manual intervention, or other functions as needed to provide access to the network printers 109 specified by the administrator.

In step 327, a network print spooler 145 executing in the computing environment 103 can manage print operations remotely. For instance, a client device 106 can perform a print operation that is communicated to the network print spooler 145, as opposed to a print spooler within the internal network 203 of an enterprise. The network print spooler 145 can perform non-traditional functions, such as selecting a particular one of the network printers 109 to perform a print operation, as opposed to a user of the client device 106 specifying the network printer 109. Additionally, through the management service 115, the network print spooler 145 can prevent performing any print operation that could result in a loss of enterprise data 136 as will be discussed.

Figure 4:
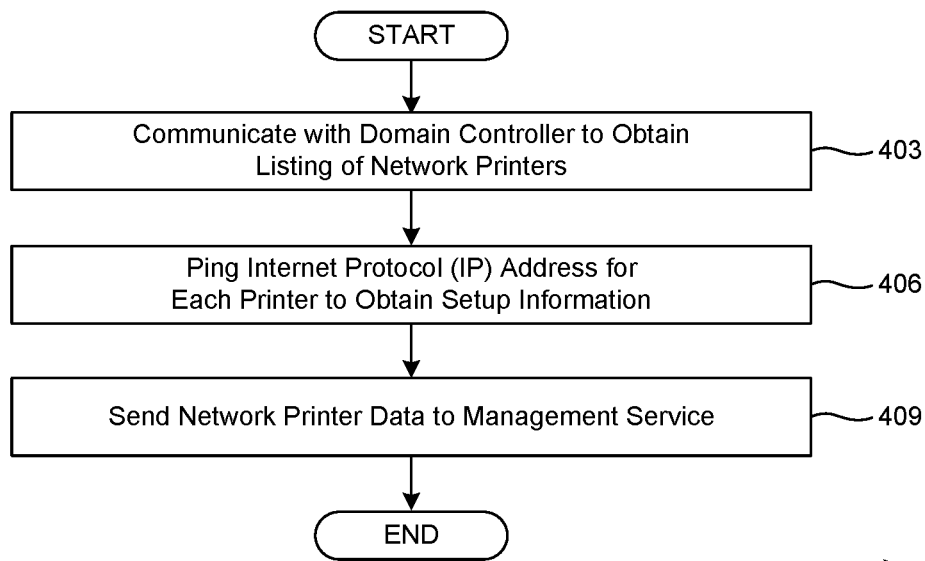
FIGS. 4-5 are flowcharts illustrating functionality implemented by components of the networked environment.

Turning now to FIG. 4, shown is a flowchart that provides one example of the operation of a portion of the printer discovery service 212. The flowchart of FIG. 4 depicts an example of elements of a method implemented by an enterprise device 209 or a service executing therein according to one or more examples. The separation or segmentation of functionality as discussed herein is presented for illustrative purposes only.

In some examples, the printer discovery service 212 can execute in an enterprise device 209. As the enterprise device 209 can be bound to an IP address in a range of enterprise IP addresses, the printer discovery service 212 can have access to information available in an internal network 203. However, it can be desirable to allow users of the client devices 106 enrolled with the management service 115 to perform a print operation if they are not connected to or bound to the enterprise network, a typical requirement to perform print operations.

Beginning with step 403, the printer discovery service 212 can communicate with the domain controller 218 to obtain or maintain a listing of network printers 109. The listing of the network printers 109 can be stored locally on the enterprise device 209 until communication is established between the enterprise device 209 and the computing environment 103.

Next, in step 406, the printer discovery service 212 can query each of the network printers 109 in the listing to obtain additional information about the network printers 109 that can be required to configure client devices 106 to access the network printers 109. For example, the printer discovery service 212 can query the network printers 109 to obtain drivers or other required configurations to configure the client devices 106 to access the network printers 109 despite individual ones of the client devices 106 having different operating systems 124 or versions of operating systems 124.

In step 409, the printer discovery service 212 can generate network printer data 130 from the listing of the network printers 109 and the additional information about the network printers 109, and can send the network printer data 130 to the management service 115. Despite the presence of a firewall 211, the printer discovery service 212 can send the network printer data 130, for example, through the cloud connector 221, a proxy server, or other suitable device.

Figure 5:
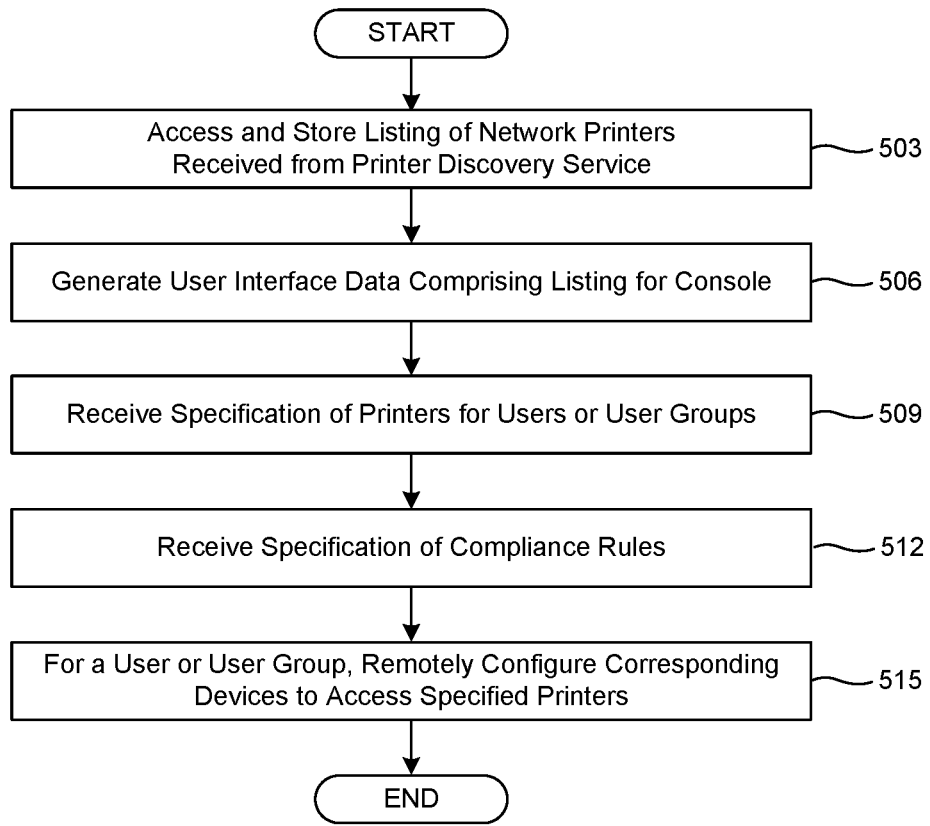

Turning now to FIG. 5, shown is a flowchart that provides one example of the operation of a portion of the management service 115. The flowchart of FIG. 5 depicts an example of elements of a method implemented by the computing environment 103 according to one or more examples. The separation or segmentation of functionality as discussed herein is presented for illustrative purposes only.

In step 503, the management service 115 can access and store the listing of the network printers 109 received by the printer discovery service 212. The management service 115 can store the network printer data 130 in the data store 114 or other appropriate memory device. In step 506, the management service 115 can generate user interface data to provide an administrator with a console where the administrator can provide user groups 142 with access to network printers 109. In some examples, the management service 115 generates the user interface data for rendering a user interface 169 of a console application on a display 172. By selecting network printers 109 identified by the printer discovery service 212, the administrator can assign printer access to particular users or user groups 142. Hence, in step 509, the management service 115 receives a specification of user groups 142 for which the network printers 109 are assigned.

Additionally, in step 512, the management service 115 can receive compliance rules 138 specified by the administrator that must be satisfied for a print operation to be performed. In one example, the administrator can specify that client devices 106 associated with a certain user group 142 are only allowed to perform print operations between a certain time, such as between 9:00 AM and 5:00 PM on a work day. In other examples, the administrator can specify that client devices 106 associated with a certain user group 142 are only allowed to perform print operations when a client device 106 is located in a particular office or within a predefined distance of a network printer 109. In other examples, the administrator can specify that client devices 106 are required to be within a predefined proximity of a network printer 109 before the print operation is released. In another example, the administrator can specify that additional authentication is required to release a print operation at a network printer 109. For example, the user can be required to perform an authentication process on his or her client device 106 where the user provides a username, password, personal identification number (PIN), biometric data, or other authentication data, as will be discussed.

Next, in step 515, the management service 115 can configure the client devices 106 enrolled with the management service 115 to have access to the network printers 109 specified by the administrator. For instance, the management service 115 can provide an agent application 118 executable on the client devices 106 with settings or other information pertaining to the network printers 109 as network printer data 130. The agent application 118 can install drivers for the printer as a background process or can configure the operating system 124 to have access to the printer using printer configuration data through a command line.

Figure 6:
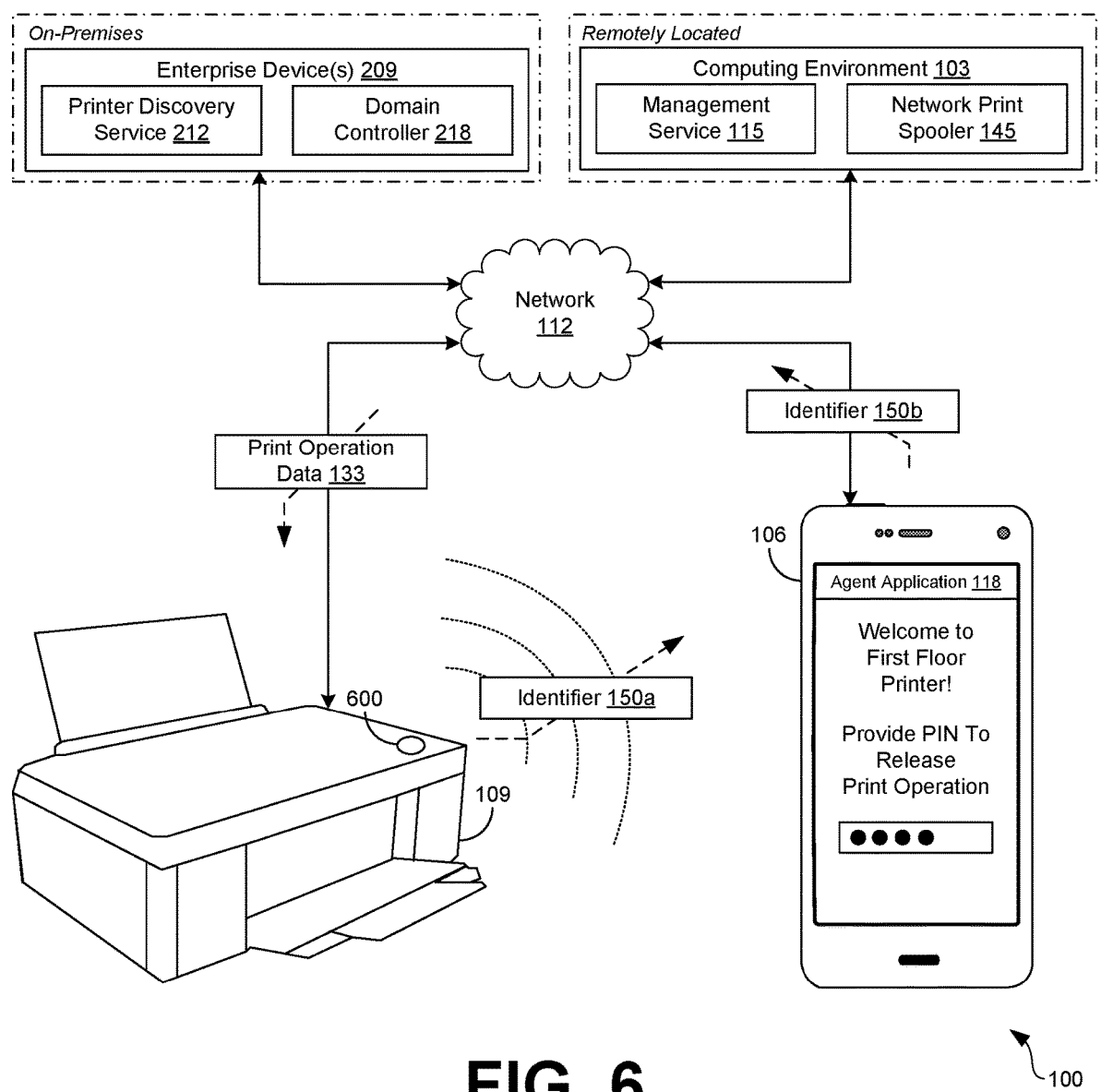
FIG. 6 is another drawing of a networked environment including a management service, a network print spooler, a network printer, and a client device.

Turning now to FIG. 6, shown is another example of the networked environment 100. In some situations, it can be beneficial for a user to be located within a predefined distance of a network printer 109 before a print operation is released, for example, to prevent information from being accessed by non-authorized personnel. To this end, a network printer 109 can be associated with a transmitter 600 that can be used to control access to the network printer 109. In one example, the transmitter 600 wirelessly broadcasts an identifier 150a and 150b that can be unique to the network printer 109 or unique to a print operation. In some examples, the transmitter 600 is a component of the network printer 109. In further examples, the transmitter 600 can be in data communication with the network printer 109.

In some examples, the transmitter 600 can include an RFID, Bluetooth®, ZigBee®, NFC, iBeacon®, infrared (IR), wireless fidelity (Wi-Fi), or other suitable type of transmitter. As can be appreciated, the client device 106 can include one or more modules capable of detecting transmission of the identifier 150. In one example, the client device 106 includes an RFID receiver capable of detecting an identifier 150 broadcast from an RFID transmitter 600. In another example, the client device 106 includes a Bluetooth® receiver capable of detecting an identifier broadcast from a Bluetooth® transmitter. The Bluetooth® transmitter 600 can include a low-energy Bluetooth® transmitter. In another example, the client device 106 includes a Wi-Fi receiver capable of detecting an identifier 150 broadcast from a Wi-Fi transmitter 600 in the form of a service set identifier (SSID). Further, the identifier 150 can be encrypted, where the agent application 118 and/or the management service 115 is capable of decrypting the identifier 150 using a key or other cryptographic method.

In additional examples, an administrator can require a client device 106 to authenticate while at or within a predefined proximity of the network printer 109. For instance, the agent application 118 can prompt a user of the client device 106 to provide a username, password, or PIN to authenticate the user. In another example, the client device 106 can prompt the user of the client device 106 to provide biometric data using a sensor of the client device 106, such as a fingerprint using a fingerprint sensor or an eye scan using a camera of the client device 106.

Authentication can be verified by the management service 115 prior to a print operation being released by the network print spooler 145. After successful authentication, the print operation can be authorized by the management service 115 and released from the network print spooler 145. As a result, the network print spooler 145 can send a print operation command or other print operation data 133 that causes the print operation to be performed.

Figure 7:
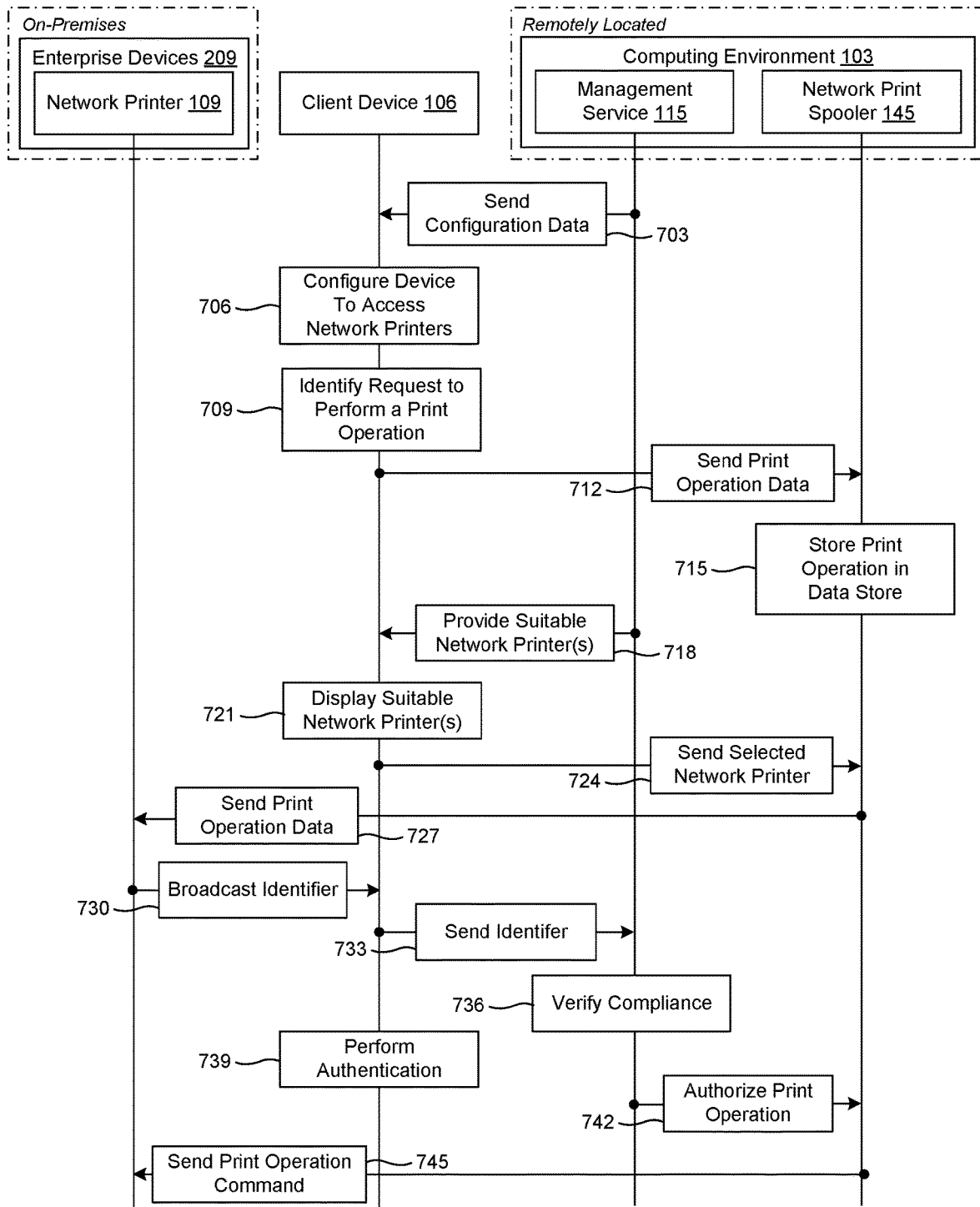
FIG. 7 is a sequence diagram illustrating functionality implemented by components of the networked environment.

Referring next to FIG. 7, shown is a sequence diagram 700 illustrating various functionality of the components of the networked environment 100. More specifically, the sequence diagram 700 describes operations performed to configure client devices 106 enrolled with the management service 115 and managing print operations.

If an administrator has specified one or more network printers 109 to assign to one or more user groups 142, the management service 115 can configure client devices 106 associated with those user groups 142 to access network printers 109 specified by the administrator. Starting with step 703, the management service 115 can send configuration data to the client device 106. Configuration data can include, for example, settings associated with the network printers 109 assigned to a user group 142 associated with the client device 106. In one example, configuration data comprises one or more extensible markup language (XML) documents accessible by the agent application 118. Configuration data can also include, for example, network printer data 130, which can include drivers, configuration data, and credentials associated with the network printers 109. Once received, in step 706, the client device 106 can use the configuration data to install drivers for one or more network printers 109, specify IP or other network protocol settings, or perform other actions associated with accessing network printers 109 on the client device 106. In some examples, the agent application 118 can cause the configuration data to be implemented on the client device 106 or can instruct the operating system 124 of the client device 106 to do so using an application programming interface (API). In other examples, the operating system 166 of the client device 106 can perform these actions.

In step 709, the client device 106 can identify a request to perform a print operation using the client device 106. For example, a user of the client device 106 can generate a command on the client device 106 to print a document, photo, spreadsheet, or form of content. In one example, the agent application 118 detects a print operation being performed in the agent application 118 or in another client application 155 executable on the client device 106. In another example, the operating system 166 can identify a request to perform a print operation. In response to a print operation being identified, in step 712, the client device 106 can send print operation data 133 for the print operation to the network print spooler 145, as opposed to a print operation being sent directly to printer.

The network print spooler 145 can include a service or application executable in the computing environment 103 that manages all print operations currently being sent to the computing environment 103. For instance, the network print spooler 145 can allow a user of the client device 106 or an administrator of the management service 115 to delete a print operation being processed or otherwise manage the print jobs currently waiting to be printed.

In one example, the network print spooler 145 can communicate with the management service 115 to identify one of the network printers 109 to complete the print operation. The network printer 109 can be selected based on a location of the client device 106, a user group 142 associated with the client device 106, a current time, or other information. However, in the example of FIG. 7, the user can be provided with a list of network printers 109 such that the user can select one of the network printers 109 to complete the print operation, as will be discussed.

In step 715, the network print spooler 145 can store the print operation data 133 in the data store 114. In some examples, the data store 114 can include a queue or buffer where print operations are handled in a first-in-first-out (FIFO), last-in-first-out (LIFO), or other suitable method. Next, in step 718, the management service 115 can provide the client device 106 with a list of suitable network printers 109 to complete the print operation. A user of the client device 106 can select one of the provided network printers 109. For instance, the user can select one of the provided network printers 109 based on his or her location in an office environment. In step 721, the client device 106 can display the network printers 109 to the user and receive a selection of one of the network printers 109 to carry out the print operation. In step 724, the client device 106 can communicate the selected network printer 109 to the network print spooler 145.

The network print spooler 145 can communicate print operation data 133 to the network printer 109 selected by the user, in step 727. In some examples, additional authentication can be required before a print operation is performed on a network printer 109. For instance, an authentication process can be performed in association with a network printer 109 to verify that a person who originated a print operation is within a predefined proximity to the network printer 109, thereby preventing dissemination of potentially confidential or sensitive information. To this end, in step 730, a transmitter 600 associated with a network printer 109 can broadcast an identifier 150.

In some examples, an administrator can specify a compliance rule 138 that requires a user be located within a predefined distance of the network printer 109 before releasing a print operation. In one example, a distance from the network printer 109 (or the transmitter) can be determined using signal strength. For example, in embodiments where the identifier 150 is broadcast using Wi-Fi, the agent application 118 can measure a signal strength of the SSID in decibels and communicate the signal strength to the management service 115. In another example, if the client device 106 detects the identifier 150, it can be assumed that the user is within a predefined distance of the network printer 109.

In further examples, a client device 106 that detects the identifier 150 is not required to be the same client device 106 that initiated the print operation, so long as they are associated with the same user account. For example, a user can perform a print operation using his or her desktop computer and use his or her smartphone or smartwatch to authenticate at the network printer 109. However, in other examples, an administrator can require that the client device 106 authenticating the user at the network printer 109 be the same device that initiated the print operation.

Upon receipt of the identifier 150, in step 733, the client device 106 can send the identifier 150 to the management service 115. The identifier 150 can be used by the management service 115 or the network print spooler 145 to identify that the user is at a location of the network printer 109. In other examples, the identifier 150 can be used to identify a print operation for the user. In either scenario, the identifier 150 and an identity of the client device 106 can be used to locate one or more print operations being assigned to the network printer 109. To this end, the management service 115 is capable of identifying whether a user is within a predefined distance of a network printer 109 authorized for use by the user.

In step 736, the management service 115 can verify that the client device 106 and the print operation complies with one or more compliance rules 138 before the print operation is authorized. In one example, the management service 115 verifies that the print operation does not violate one or more compliance rules 138. For instance, an administrator can specify that certain user groups 142 do not have permission to use printers outside of work hours, or the administrator can limit the number of pages able to be printed within a predefined period of time. In another example, the management service 115 verifies that a profile for a client device 106 complies with the compliance rules 138. For instance, the management service 115 can verify that the client device 106 does not have malicious or blacklisted applications installed and is not jailbroken or rooted before authorizing the print operation.

Assuming the client device 106 and the print operation complies with the compliance rules 138, in step 739, the client device 106 can perform an authentication of the user on the client device 106, if required. In one example, the client device 106 can prompt a user of the client device 106 to provide a username, password, or a PIN to authenticate the user while the client device 106 is within a predefined proximity of a network printer 109 assigned to the print operation. In another example, the client device 106 can prompt the user of the client device 106 to provide biometric data using a sensor of the client device 106, such as a fingerprint using a fingerprint sensor or an eye scan using a camera of the client device 106.

After successful authentication, in step 742, the management service 115 can authorize the print operation, which causes the print operation to be released by the network print spooler 145. In one example, the management service 115 can authorize the print operation after modifying the print operations based on compliance rules 138. For instance, a compliance rule 138 may specify that print operations containing confidential information must be watermarked with information indicating the confidential nature of the information and an owner associated with the information (e.g., a particular enterprise or organization). In such a case, the management service 115 can modify the print operation to comply with the compliance rules 138 by scanning the content of the print operation, comparing the content to a database of known confidential data or data structures, identifying matches exceeding a threshold match score to identify confidential information, and watermarking one or more pages of the print operation as described above. Additionally, in one example, the management service 115 can modify the print operation by including a credential needed to authenticate the print operation with the network printer 109, such as a token or certificate. Thereafter, in step 745, the network print spooler 145 can send a print operation command to the network printer 109 that initiates the print operation on the network printer 109. Once the print operation is completed on the network printer 109, the print operation can be deleted from a print queue by the management service 115 or network print spooler 145, if necessary.

Figure 8:
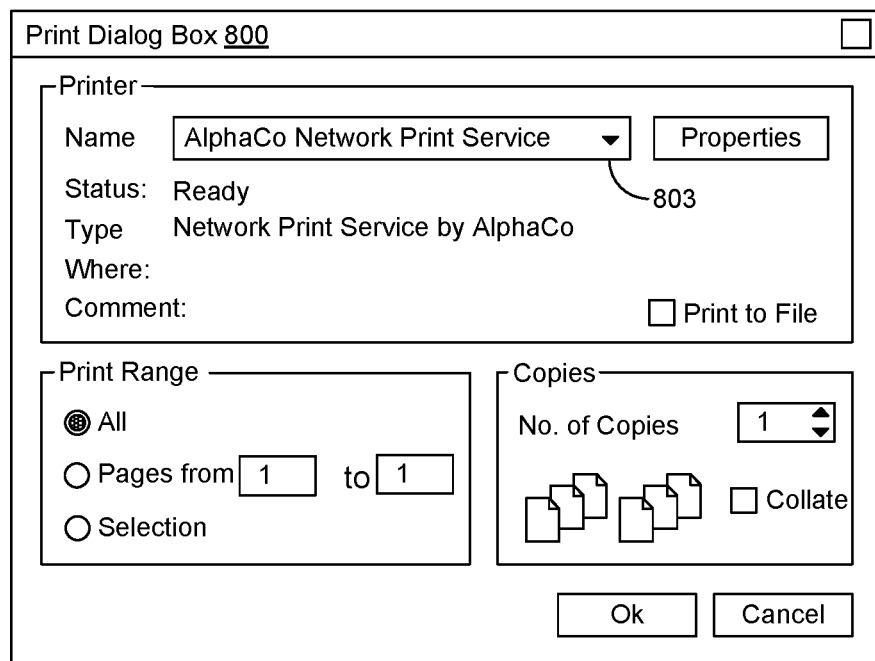
FIG. 8 is a print dialog box for use in a user interface rendered on a client device of the networked environment.

Moving on to FIG. 8, a print dialog box 800 is shown that can be rendered in a user interface 169 for display on a client device 106. In some examples, network-based print operations are managed by the management service 115 where the client device 106 is not required to be bound to a range of IP addresses associated with an enterprise network to perform print operations. Additionally, the network-based print operations allow an administrator to remotely control access to particular network printers 109.

In one example, a driver can be installed on a client device 106 to manage network-based print operations for the client device 106. Any print operations used in association with that driver can be communicated to the computing environment 103 for network-based print operations. For instance, in the print dialog box 800, the user can select "AlphaCo Network Print Service" in dropdown box 803, as opposed to selecting individual network printers 109 from the dropdown box 803. When submitted, the current print operation is communicated from the client device 106 to the computing environment 103, as opposed to directly being communicated to a printer specified by the user. As can be appreciated, the management service 115 can select a suitable network printer 109 on behalf of the user or can provide the user with a list of network printers 109 allowing the user to select one from the list.

Figure 9:
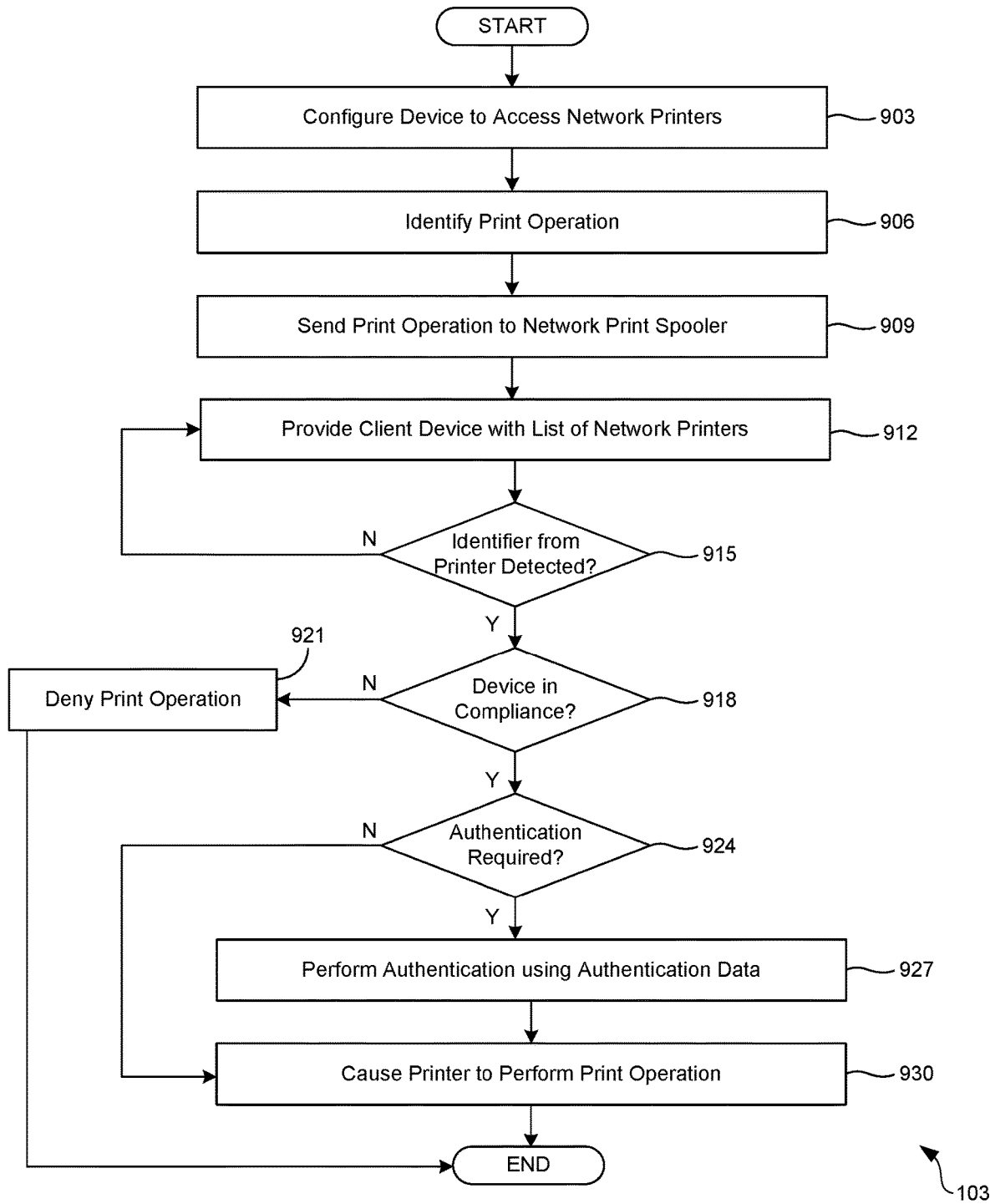
FIG. 9 is another flowchart illustrating functionality implemented by components of the networked environment.

Moving on to FIG. 9, shown is a flowchart that provides one example of the operation of a portion of the computing environment 103 for remotely managing print operations. The flowchart of FIG. 9 depicts an example of elements of a method implemented by the management service 115 or other service executable in the computing environment 103 according to one or more examples. The separation or segmentation of functionality as discussed herein is presented for illustrative purposes only.

The management service 115 can provide an administrator with a console that allows the administrator to specify the configuration of client devices 106 enrolled with the management service 115. The configuration specified by the administrator can be remotely managed by the management service 115. In step 903, the management service 115 can configure the client devices 106 in accordance with the specified configuration, for example, to access one or more of the network printers 109.

In one example, the management service 115 can communicate one or more drivers for the network printers 109 to the agent application 118 for installation on the client device 106. In another example, the management service 115 can communicate network printer data 130 that allows the agent application 118 to add or remove access to a network printer 109 on the client device 106 by automatically specifying printer settings in a control panel or an operating system 124 of the client device 106, or by installing a configuration profile containing such settings in a profile bank of the operating system 124. The printer settings can include, for example, an IP address, a TCP/IP address, a name, a description, wireless configuration settings, such as Bluetooth® or Wi-Fi settings, or other information used to add or remove access to the network printer 109.

In some examples, the management service 115 configures the client device 106 to add a printing option that, when selected in a print dialog box 800, sends a print operation to the computing environment 103. Hence, in step 906, the management service 115 can identify when a print operation is performed on a client device 106 enrolled with the management service 115. The management service 115 can send the print operation to the network print spooler 145, in step 909. The network print spooler 145 executing in the computing environment 103 can manage print operations remotely. For instance, a client device 106 can perform a print operation communicated to the network print spooler 145, as opposed to a print spooler within the internal network 203 of an enterprise. The network print spooler 145 can perform non-traditional functions, such as selecting a particular one of the network printers 109 to perform a print operation, as opposed to a user of the client device 106 specifying the network printer 109. Additionally, through the management service 115, the network print spooler 145 can abstain from performing any print operation that could result in a loss of enterprise data 136.

Next, in step 912, the management service 115 can provide the client device 106 with a list of network printers 109 to complete the print operation. A user of the client device 106 can select one of the provided network printers 109. For instance, the user can select one of the provided network printers 109 based on his or her location in an office environment.

The network print spooler 145 can communicate print operation data 133 to the network printer 109 selected by the user. However, in some examples, additional authentication can be required before performing a print operation on a network printer 109. For instance, an authentication process can be performed in association with the printer to verify that a person who originated a print operation is within a predefined proximity to the network printer 109, thereby preventing dissemination of enterprise data 136 or other potentially confidential information. Hence, in step 915, the computing environment 103 can determine whether an identifier 150 has been detected by the client device 106 that indicates that the client device 106 is within a predefined proximity of the selected network printer 109.

In one example, the management service 115 can detect the print operation being performed on the client device 106 and generate the identifier 150 based on the print operation. For example, the management service 115 can generate an identifier 150 that uniquely identifies one of the network printers 109 or uniquely identifies the print operation. The management service 115 can send the identifier 150 to the network printer 109 (or directly to the transmitter 600) over the network 112 which causes the transmitter 600 to broadcast the identifier 150. If the identifier 150 has not been detected, the process can revert to step 912.

If the identifier 150 has been detected by the client device 106 and received by the computing environment 103, the process can continue to step 918 where the computing environment 103 can determine whether the client device 106 requesting the print operation complies with one or more compliance rules 138. For example, an administrator can specify a compliance rule 138 that requires a user be located within a predefined distance of the network printer 109 before releasing a print operation. In another example, an administrator can specify compliance rules 138 that indicate that certain user groups 142 do not have permission to use printers outside of normal work hours. In another example, an administrator can specify compliance rules 138 that limit the number of pages able to be printed within a predefined amount of time. In yet another example, an administrator can specify that personal or non-enterprise print operations are prohibited. In yet another example, the management service 115 verifies that a profile for a client device 106 complies with the compliance rules 138, such as the profile indicating that the client device 106 has not been jailbroken or provided with root access. Additionally, the management service 115 can verify that the client device 106 does not have malicious code installed or executing thereon before authorizing the print operation.

If the client device 106 or the print operation does not comply with the compliance rules 138, the process can proceed to step 921 where the print operation is denied. Thereafter, the process can proceed to completion. However, if the client device 106 and the print operation are in compliance, the process can proceed to step 924 where it is determined whether additional authentication is required. For instance, an administrator can specify that a user be required to provide a username, password, or a PIN to authenticate the user while at the network printer 109. In another example, a client device 106 can prompt the user of the client device 106 to provide biometric data using a sensor of the client device 106, such as a fingerprint using a fingerprint sensor or an eye scan using a camera of the client device 106. If authentication is required, the process can proceed to step 927 the computing environment 103 performs authentication using authentication data.

In some examples, the computing environment 103 can authenticate a print operation solely upon detection of the identifier 150 by the client device 106. Once a print operation is sent to the management service 115 and a network printer 109 is assigned, for example, a user can perform a print operation that is sent to the management service 115. The management service 115 can assign a network printer 109 to the print operation and the user can walk to a location of the network 109 printer having the client device 106 in their pocket, on their wrist, in their hands, or other suitable location, and the computing environment 103 can automatically authenticate the print operation based on a proximity detection between the client device 106 and the network printer 109. Thereafter, a document for the print operation can begin to print.

If authentication is not required, the process can skip to step 930 where the print operation is released. This can include sending a print operation command to the network printer 109 selected by the user of the client device 106 (or automatically identified by the management service 115), to perform the print operation requested by the user. Similarly, in response to a successful authentication being performed, the print operation can be released to the network printer 109. Successful authentication can include, for example, a comparison of authentication data provided by the user on the client device 106 with authentication data previously stored in the data store 114. For example, a username, password, PIN, or biometric data provided by the user can be compared to authentication data provided during an enrollment process or specified by the administrator. If the authentication data matches, the authentication is deemed successful and the print operation is authorized and released. However, if the authentication is not successful, the print operation can be denied and other remedial actions can be performed, such as notifying an administrator, notifying a user of the client device 106, or adding an appropriate entry to a log. Thereafter, the process can proceed to completion.

In additional examples, the management service 115 can maintain a log for the print operations performed by the client devices 106 on the network printers 109. Additionally, if a number of print operations pending in a print queue exceeds a predefined threshold (indicating that a network printer 109 is not ready to print), the management service 115 can provide the client devices 106 having print operations pending with a notification describing an estimated time until the print operation is ready, a notification indicating that the print operation is next in the queue, or other similar notification.

The client devices 106 or devices comprising the computing environment 103 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 155, and potentially other applications. Also stored in the memory can be a data store 114 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 169 generated by the client application 155 or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 155, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:

at least one computing device configured for communication with a network printer; and program instructions executable in the at least one computing device that, when executed, cause the at least one computing device to:

enroll a client device with a remote management service configured to oversee operation of the client device by providing an agent application executable on the client device with a management profile, wherein an installation of the management profile causes an operating system of the client device to provide the agent application with device administrator privileges;

receive a selection of the network printer from a listing of available network printers presented on the client device;

in response to a print operation being initiated by the client device, generate and send an identifier to the network printer as selected that causes the network printer to perform a wireless broadcast of the identifier, the identifier uniquely identifying the print operation assigned to the network printer;

in response to the client device detecting the wireless broadcast of the identifier from a wireless transmitter of the network printer, receive a communication from the client device over a network that comprises the identifier;

determine that an authentication of the client device is required in association with the print operation;

in response to the authentication being required, cause the agent application executable on the client device to obtain authentication data while the client device is within a predefined distance of the network printer;

cause the authentication to be performed based at least in part on the authentication data received from the client device; and in response to the authentication being successful, send a communication to the network printer that causes the print operation to be performed.

2. The system of claim 1, wherein the wireless broadcast performed by the wireless transmitter uses at least one of: radio-frequency identification (RFID), Bluetooth®, ZigBee®, NFC, iBeacon®, infrared (IR), or wireless fidelity (Wi-Fi).

3. The system of claim 1, wherein the authentication data comprises at least one of a username, a password, a personal identification number (PIN), biometric data, or a combination thereof.

4. The system of claim 1, wherein the authentication comprises determining that the client device is within a predefined proximity of the network printer.

5. The system of claim 1, wherein the authentication comprises determining that the client device or the print operation complies with at least one of a plurality of compliance rules.

6. The system of claim 1, further comprising program instructions executable in the at least one computing device that, when executed, further cause the at least one computing device to:
  detect a request to perform the print operation using the client device;
  generate the identifier at the at least one computing device;
  cause the identifier to be sent to the network printer over the network through a network interface; and
  cause the wireless transmitter to wirelessly broadcast the identifier.

7. The system of claim 1, wherein the identifier uniquely identifies the network printer or the print operation.

8. A non-transitory computer-readable medium embodying program instructions executable in at least one computing device that, when executed, cause the at least one computing device to:
  enroll a client device with a remote management service configured to oversee operation of the client device by providing an agent application executable on the client device with a management profile, wherein an installation of the management profile causes an operating system of the client device to provide the agent application with device administrator privileges;
  receive a selection of the network printer from a listing of available network printers presented on the client device;
  in response to a print operation being initiated by the client device, generate and send an identifier to the network printer as selected that causes the network printer to perform a wireless broadcast of the identifier, the identifier uniquely identifying the print operation assigned to the network printer;
  in response to the client device detecting the wireless broadcast of the identifier from a wireless transmitter of the network printer, receive a communication from the client device over a network that indicates that comprises the identifier;
  determine that an authentication of the client device is required in association with the print operation;
  in response to the authentication being required, cause the agent application executable on the client device to obtain authentication data while the client device is within a predefined distance of the network printer;
  cause the authentication to be performed based at least in part on the authentication data received from the client device; and
  in response to the authentication being successful, send a communication to the network printer that causes the print operation to be performed.

9. The non-transitory computer-readable medium of claim 8, wherein the wireless broadcast performed by the wireless transmitter uses at least one of: radio-frequency identification (RFID), Bluetooth®, ZigBee®, NFC, iBeacon®, infrared (IR), or wireless fidelity (Wi-Fi).

10. The non-transitory computer-readable medium of claim 8, wherein the authentication data comprises at least one of a username, a password, a personal identification number (PIN), biometric data, or a combination thereof.

11. The non-transitory computer-readable medium of claim 8, wherein the authentication comprises determining that the client device is within a predefined proximity of the network printer.

12. The non-transitory computer-readable medium of claim 8, wherein the authentication comprises determining that the client device or the print operation complies with at least one of a plurality of compliance rules.

13. The non-transitory computer-readable medium of claim 8, further comprising program instructions executable in the at least one computing device that, when executed, further cause the at least one computing device to:
  detect a request to perform the print operation using the client device;
  generate the identifier at the at least one computing device;
  cause the identifier to be sent to the network printer over the network through a network interface of the network printer separate from the wireless transmitter; and
  cause the wireless transmitter to wirelessly broadcast the identifier.

14. The non-transitory computer-readable medium of claim 8, wherein the identifier uniquely identifies the network printer or the print operation.

15. A computer-implemented method, comprising:
  enrolling a client device with a remote management service configured to oversee operation of the client device by providing an agent application executable on the client device with a management profile, wherein an installation of the management profile causes an operating system of the client device to provide the agent application with device administrator privileges;
  receiving a selection of the network printer from a listing of available network printers presented on the client device;
  in response to a print operation being initiated by the client device, generating and sending an identifier to the network printer as selected that causes the network printer to perform a wireless broadcast of the identifier, the identifier uniquely identifying the print operation assigned to the network printer;
  in response to the client device detecting the wireless broadcast of the identifier from a wireless transmitter of the network printer, receiving a communication from the client device over a network, wherein the identifier uniquely identifies the network printer or a print operation assigned to the network printer;
  determining that an authentication of the client device is required in association with the print operation;
  in response to the authentication being required, causing the agent application executable on the client device to obtain authentication data while the client device is within a predefined distance of the network printer;
  causing the authentication to be performed based at least in part on the authentication data received from the client device; and
  in response to a successful authentication being performed, sending a communication to the network printer that causes the print operation to be performed by the network printer.

16. The computer-implemented method of claim 15, wherein the wireless broadcast performed by the wireless transmitter uses at least one of: radio-frequency identification (RFID), Bluetooth®, ZigBee®, NFC, iBeacon®, infrared (IR), or wireless fidelity (Wi-Fi).

17. The computer-implemented method of claim 15, wherein the authentication data comprises at least one of a username, a password, a personal identification number (PIN), biometric data, or a combination thereof.

18. The computer-implemented method of claim 15, wherein the authentication comprises determining that the client device is within a predefined proximity of the network printer.

19. The computer-implemented method of claim 15, wherein the authentication comprises determining that the client device or the print operation complies with at least one of a plurality of compliance rules.

20. The computer-implemented method of claim 15, further comprising:
   detecting a request to perform the print operation using the client device;
   generating the identifier at the at least one computing device;
   causing the identifier to be sent to the network printer over the network through a network interface of the network printer separate from the wireless transmitter; and
   causing the wireless transmitter to wirelessly broadcast the identifier.

\* \* \* \* \*